A. Arnold,
Reciprocating Saw Mill.
Nº 15,163.  Patented June 24, 1856.
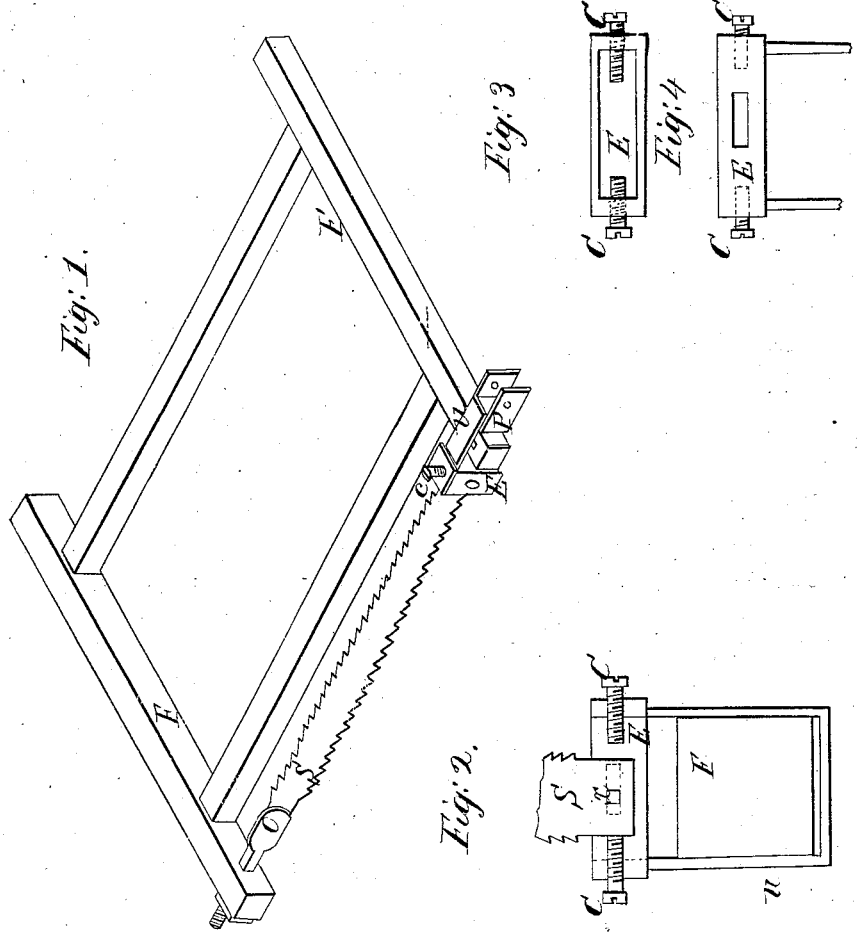

UNITED STATES PATENT OFFICE.

AZA ARNOLD, OF WASHINGTON, DISTRICT OF COLUMBIA.

SELF-SETTING OR SELF-RAKING SAW FOR SAWING MACHINERY.

Specification of Letters Patent No. 15,163, dated June 24, 1856.

*To all whom it may concern:*

Be it known that I, AZA ARNOLD, of Washington, in the District of Columbia, have invented certain new and useful Improvements in Sawmills; and I hereby declare the following to be a true and exact description thereof, reference being made to the drawings herewith presented, which drawings constitute a part of said description.

My invention consists in the application of certain devices to the two edged double reciprocating sawmill, in such manner as to enable the mill to perform not only more and better work in a given time but to do it with less manual labor. For this purpose I use a two edged saw, that is one having teeth on both sides in order to cut a board at each move of the carriage, to right and left.

I am aware that a two edge saw has been tried before but a difficulty has been hitherto encountered in regard to regulating the feed or cut of each stroke. It is always desirable to have the saw strike forward according to the conditions of the logs to be sawed. If the log be large and hard the mill may be able to cut only one fourth of an inch at a stroke but if the log be soft it may be desirable to feed three fourths of an inch at each stroke. Now in order to make the two edged saw cut three fourths of an inch each way it must in the old way be made tapering three fourths on each side that is three half inches in the length of the stroke (say two feet) and if the saw be six feet in length it will be four and a half inches wider at the top than at bottom. If in this condition it be required to feed only half as much the saw will cut only half its length.

Now it is evident that if the saw has to perform all its work during one fourth part of the revolution of the crank then a violent strain must be thrown upon the several parts of the machine; these and other difficulties have hitherto prevented the two edged saw from being brought into any considerable use; but by my improvements the difficulties are completely obviated, and I am enabled to graduate the feed, and cut of my mill, and to have the cut commence at the first descent of the stroke, and am not compelled to have the saw tapered at all.

My mill is so constructed as to have the carriage pass the whole length of the log beyond the saw in order to allow the setting for the thickness of a plank before the return motion begins. This arrangement is not uncommon and will require no description at this time, since any competent mechanic can supply the means. But what is essentially new to the reciprocating saw is the self adjusting movement which takes place at the commencement of sawing each board. When the end of the log moves up to the saw it comes in contact with the front of the teeth at the lower part of the saw and the foot of the saw retreats to a certain distance which is determined by a stop or screw as will be seen in the drawing. Having retreated to its place the saw hangs over forward precisely enough for the cut of the stroke. It continues in this position until the log is cut completely through and when the log has been set for another board and comes back against the opposite side of the saw it again retreats until the heel comes to the opposite stopper. It will be perceived that by turning these screws the inclination of the saw is readily limited to correspond to any length of feed motion required. This adjustment clasp will be understood by reference to the drawing. See the drawings.

Figure 1 is an isometrical view of the saw frame (F).

Fig. 2 is a vertical section of the clasp (E) having its strap (U) formed in one and the same piece of metal, this extending downward embraces the cross timber of the saw frame or sash (F). This section shows the manner of adjusting the lower end of the saw (S) between the two screws (C, C). These screws are placed far enough apart to allow more or less play, so that the saw (S) shall retreat to a proper position to correspond to the length of the cut. That is to say if the mill shall feed forward half an inch at each revolution of the crank, allowing the length of the up and down motion of the saw to be one third of its length then the top of the saw must stand over forward of the lower teeth just three half inches.

It should be observed that this saw being required to cut a board alternately to the right and left, must be self adjusting so that when one board has been cut the log having passed its whole length beyond the saw and being set forward to the proper thickness for another board moves back in contact with the other edge of the saw, the saw again retreats from the pressure of the log, until it has adjusted itself against the set screw (C). This adjustment takes place for each board but the degree of inclination is of importance, and is controlled by the attendant, turning the screw (C) in order to suit the condition of the logs.

Fig. 3 is a top view of the clasp.

Similar letters indicate the same part in each of the several figures.

Fig. 4 is a side view of the clasp without the saw in order to show the slot in which the kee or fid (X) moves. I design to use this retreating motion combined with the two edged saw for the finer kinds of sawing, as for veneers and for shingles and clapboards as well as for plank and timber.

I do not claim the making or using of a two edged saw, neither do I mean to confine myself to any precise form or dimensions of the mill for my new method of adjustment as before described is applicable to various forms of common saw mills whether they be operated by steam, by water or other power, whether the saw vibrates vertically or in a horizontal or inclined position. I prefer a double mill that is having a sash or saw frame so constructed as to have a saw on each end of the cross head and two carriages, each log being moved and cut independently but in some situations I design to use single mills.

What I claim as my improvement and desire to secure by Letters Patent is—

The combination of a retreating motion (as set forth in the foregoing description) with the two-edged reciprocating saw; by which combination I can give any desired adjustment of cut, and feed, at pleasure to enable the saw to cut during its whole descent.

In testimony whereof I hereto subscribe my name in the presence of two witnesses.

AZA ARNOLD.

Witnesses:
JOHN S. HOLLINGSHEAD,
E. G. HANDY.